(No Model.)
W. O. NELSON.
LUBRICATOR.
No. 517,553. Patented Apr. 3, 1894.
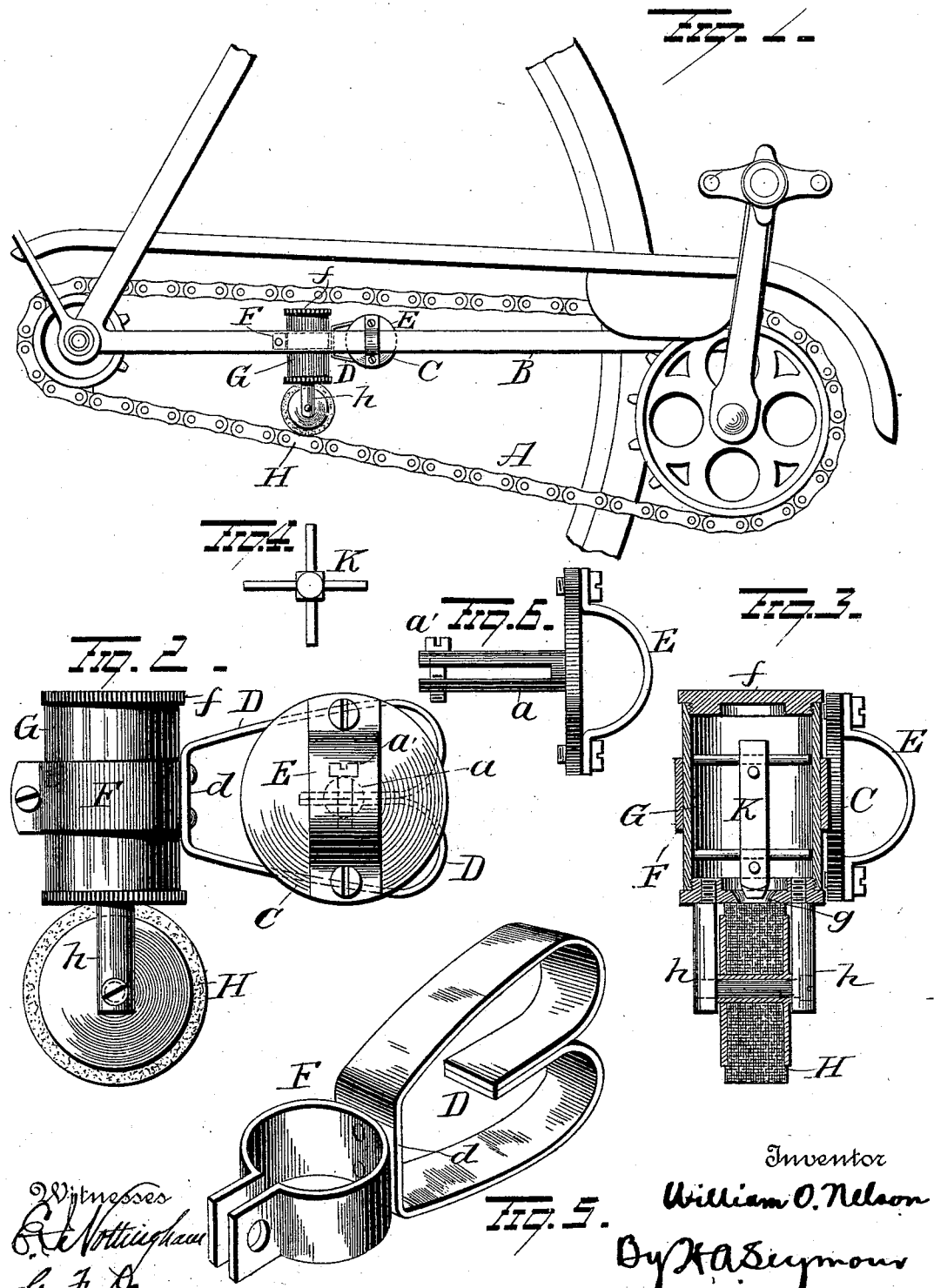
Inventor
William O. Nelson
By H. A. Seymour
Attorney
Witnesses
R. E. Nottingham
G. F. Downing

UNITED STATES PATENT OFFICE.

WILLIAM O. NELSON, OF BALTIMORE, MARYLAND.

LUBRICATOR.

SPECIFICATION forming part of Letters Patent No. 517,553, dated April 3, 1894.

Application filed June 21, 1893. Serial No. 478,400. (No model.)

*To all whom it may concern:*

Be it known that I, WILLIAM O. NELSON, of Baltimore, in the State of Maryland, have invented certain new and useful Improvements in Lubricators; and I do hereby declare the following to be a full, clear, and exact description of the invention, such as will enable others skilled in the art to which it appertains to make and use the same.

My invention relates to an improvement in lubricators designed for supplying dry or moist lubricant such as plumbago and other similar substances to movable parts of machinery or apparatus, the object being to provide a simple and cheap device designed to be readily applied to the machine or apparatus for lubricating parts thereof, and it consists in a reservoir or chamber for containing the lubricant and having a discharge opening, and a rotary brush or feeder located in close proximity to said opening and operating as a valve to regulate the discharge, and to convey the lubricant to and deposit it on the surface to be lubricated.

My invention further consists in a spring support and means for attaching same to a machine or apparatus, a reservoir or container carried by said spring support, and a revolving brush or feed wheel located under the discharge opening in said reservoir or container and adapted to discharge a lubricant on the working face or surface where it is to be applied.

My invention further consists in a spring supported container having a discharge opening, an agitator located within said container, and a rotary brush or feeder located below said discharging opening and adapted to supply lubricant to the working face or surface where it is to be applied.

For the purpose of illustration I have disclosed my improvement applied to a bicycle for lubricating the sprocket or driving chain thereof and will describe it in connection with a bicycle, but would have it distinctly understood at the start, that its use is not limited to a bicycle or vehicle of any kind, but is capable of use in connection with apparatus or machinery employing movable parts which require lubrication.

In the accompanying drawings, Figure 1 is a view showing the device applied to a bicycle. Fig. 2 is an enlarged view in elevation of the lubricator removed. Fig. 3 is a view in section through the container and feeding wheel. Fig. 4 is a view of the agitator removed. Fig. 5 is a view of the spring support and Fig. 6 a view of the clamping plate.

A represents a sprocket chain carried by the sprocket wheels of the driving wheel and crank axle of a bicycle, and B is a horizontal section of the bicycle frame. This section B is located conveniently for the attachment of the clamping disk C which latter is provided on one face with split stud $a$ for the attachment of spring support D, and on its opposite face with the loop E, the latter being held in place preferably by two screws. This loop is of a size sufficient to embrace the section B of the frame and hold the disk C thereon, and being curved permits the disk to be turned so as to bring the surface of the feeder in proper contact with the face of the chain.

The stud $a$ is slotted as shown to receive the free ends of the spring support D. This support is of flat spring metal bent into loop form, the free ends being turned inwardly and passed through the slot in the stud and are held thereby by set screw $a'$. The stud and slot therein are greater in length than the width of the spring metal constituting the support, so that the support can be turned in or out as necessity demands to bring the feeding wheel centrally over the chain. The central portion of the spring support is flattened as at $d$ for the attachment of the split ring F, the latter being secured to the support by rivets and provided at its free ends with a set screw for clamping it to the container G. This container G is cylindrical in shape and provided with a screw cap $f$ by means of which the lubricant such as plumbago, in a powdered form is introduced, and is preferably provided with a removable bottom plate having a central opening $g$ for the escape of the lubricant, and with two downwardly projecting posts $h$ forming supports for the rotary brush or feeding wheel H. This wheel H consists essentially of two sheet metal disks and a number of disks of canton flannel felt or other suitable material, the metal disks constituting the outsides of the wheel, and supports for the other disks. The edge or periphery of the wheel moves in contact with the lower head or plate of the reservoir or container and being immediately under the discharge opening or openings therein takes up the lubricant as it passes through and deposits it on the working face of the chain with which the wheel moves in contact.

To prevent the lubricant from packing in the container, I have provided the agitator K which being free within the container is kept in motion by the jarring of the frame or the vibrating motion imparted by the feed wheel coming in contact with the surface of the chain and keeps the graphite in a powdered condition.

It will be apparent that plumbago in a solid form can be used in my lubricator by enlarging the opening in the container and bringing the lower surface of mass of lubricant in contact with the revolving feed wheel in which case the agitator can be dispensed with.

By the arrangement described the parts can be turned and adjusted to bring the feeding wheel squarely over the chain so as to lubricate the entire working face of the latter, and by mounting it on a spring support the parts can yield or give under pressure without danger of injury.

While I have described my improvement as applied to a bicycle, it is evident that it can be used with good results on other devices employing sprocket chains or exposed parts to be lubricated and hence I would have it understood that I do not confine the use of my invention to bicycles alone. Neither do I confine myself to the exact details of construction shown as it is evident that changes and alterations may be made without departing from the spirit of my invention.

Having fully described my invention, what I claim as new, and desire to secure by Letters Patent, is—

1. In a lubricator, the combination with a reservoir adapted to hold a lubricant, and a rotary feed wheel, of a spring support having a split ring thereon, means for tightening or loosening the ring about the reservoir whereby the latter may be shifted, a disk constructed for attachment to a support, said disk having a split pin, and means for closing the split end whereby the spring support may be shifted, substantially as set forth.

2. In a lubricator, the combination with a reservoir having an opening in its lower end for the discharge of the lubricant, of a rotary feed wheel located below the hole in position to close the latter and receive a supply of lubricant thereon and an agitator inside of the reservoir adapted to project down through the hole and bear upon the wheel whereby it is kept agitated by the movement of the wheel, substantially as set forth.

3. In a lubricator, the combination with a clamping disk having a stud, of a spring support carried by said slotted stud and a lubricator secured to said spring support.

In testimony whereof I have signed this specification in the presence of two subscribing witnesses.

WILLIAM O. NELSON.

Witnesses:
WILLIAM H. BERRY,
THOS. M. DOBBIN.